May 31, 1966 C. E. SCHWAB 3,254,339
APPARATUS FOR IMPROVING THE SIGNAL-TO-NOISE RATIO OF
VARYING, PERIODICALLY-RECURRING SIGNALS
Filed April 1, 1964 2 Sheets-Sheet 1

United States Patent Office 3,254,339
Patented May 31, 1966

3,254,339
APPARATUS FOR IMPROVING THE SIGNAL-TO-NOISE RATIO OF VARYING, PERIODICALLY-RECURRING SIGNALS
Carl E. Schwab, Huntington Station, N.Y., assignor to Hazeltine Research, Inc., a corporation of Illinois
Filed Apr. 1, 1964, Ser. No. 356,609
3 Claims. (Cl. 343—17.1)

The present invention relates to apparatus for improving the signal-to-noise ratio of signals which recur at a substantially constant repetition rate.

While the invention may be used in a variety of signal processing systems, it will be described as it would be used in a moving target indicator radar system, an environment in which it is particularly useful. As its name implies, the purpose of such a system is to differentiate radar return signals representative of moving targets from radar return signals representative of stationary targets and to indicate, by displaying on the face of a cathode-ray tube, for example, only the moving target returns. The moving target indications produced by such a system, however, are undesirably accompanied by noise return indications which may, at times, be comparable in magnitude to the moving target indications themselves. When the moving target indications are displayed under these circumstances, it will be found that the noise return indications are displayed with sufficient brightness to make difficult the location of a moving target on the face of the cathode-ray tube.

Objects of the present invention, therefore, are to provide apparatus for increasing the ease with which a moving target may be located on the face of a cathode-ray tube in a moving target indicator radar system in the presence of noise and to provide such a result by improving the signal-to-noise ratio of the radar signal information applied to the cathode-ray tube.

For a better understanding of the present invention together with other and further objects thereof, reference is had to the following description taken in connection with the accompanying drawings, and its scope will be pointed out in the appended claims.

Figure 1:
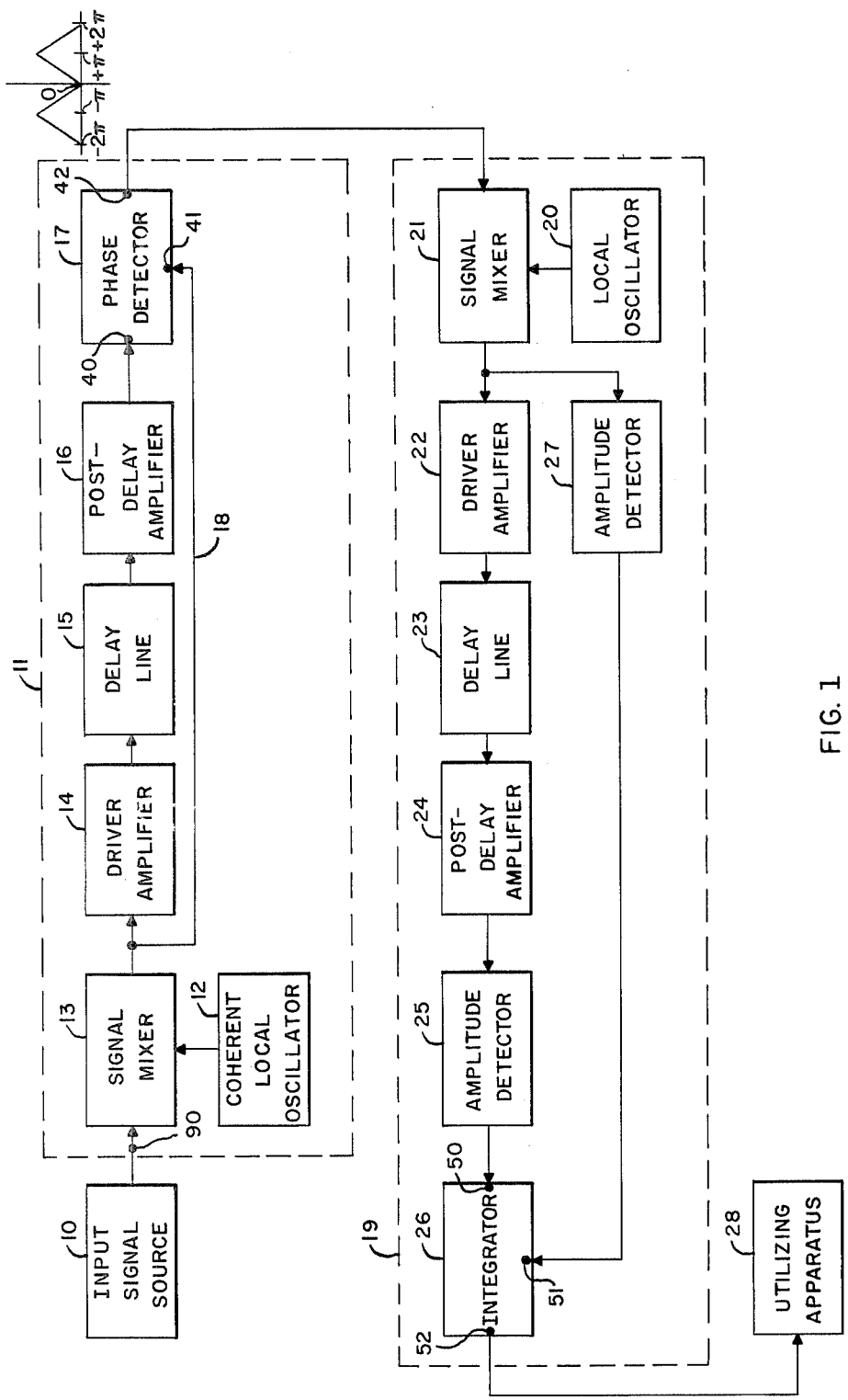
Figure 2:
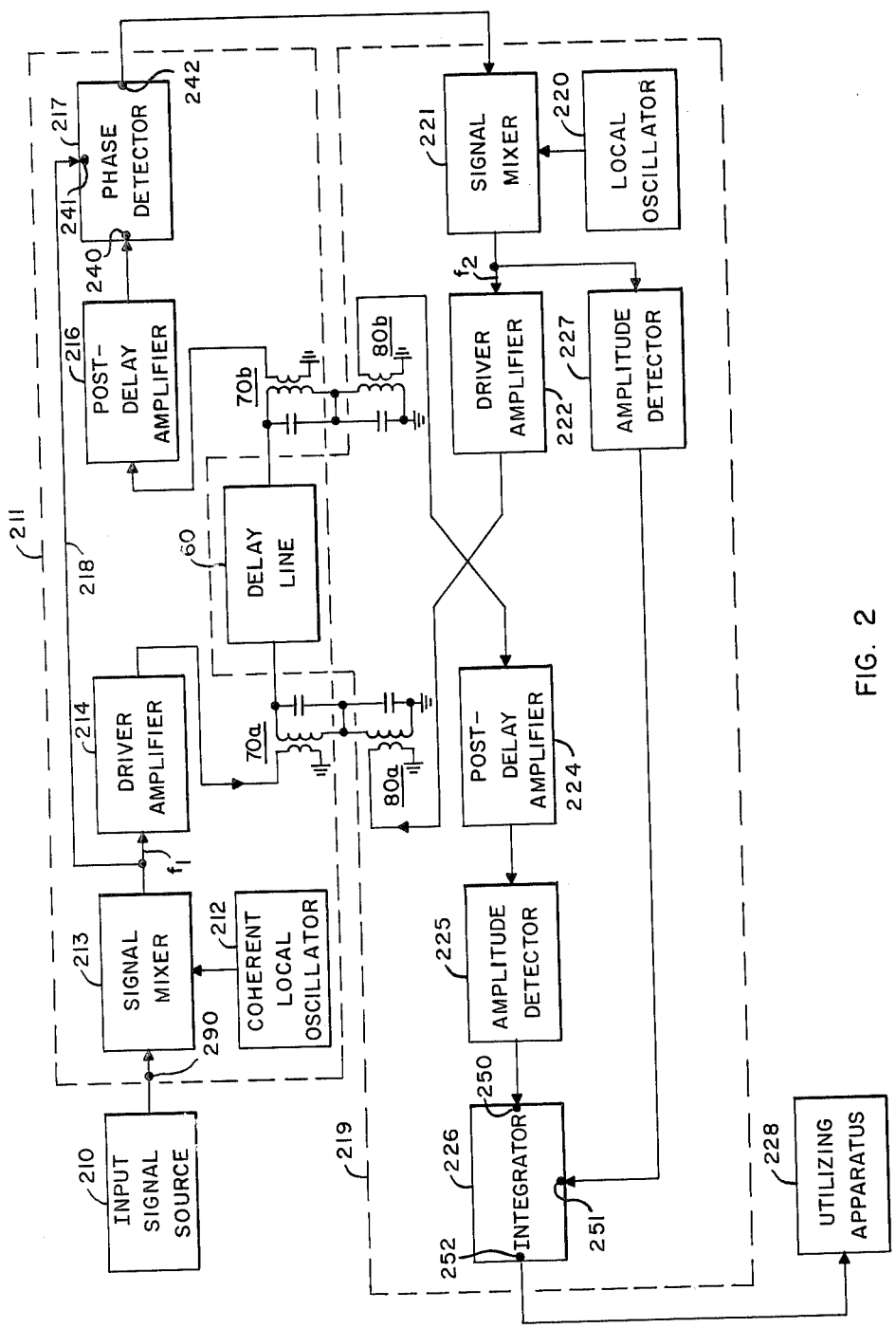

FIG. 1 is a block diagram of a particular form of signal processing apparatus constructed in accordance with the present invention, and FIG. 2 illustrates a modified form of signal processing apparatus in accordance with the invention.

*Description and operation of the signal processing apparatus of FIG. 1*

Referring to FIG. 1 of the drawings, the signal processing apparatus there shown includes a source of input signals 10 which, for the moving target indicator radar system example chosen, may be the radar receiver. The input signals supplied by source 10 are of three types—radar return signals representative of moving targets, radar return signals representative of stationary targets and noise signals. The moving target signals, in turn, are of two types—signals representative of targets which move at a constant radial velocity, and signals representative of targets which move at a nonconstant or varying radial velocity. It is to be noted in this regard that a target is considered to be a moving target when it moves with respect to ground, while a target is considered to be a stationary target when it does not so move. It is also to be noted that the radar receiver may be either airborne or ground based.

For purposes of the discussion that follows, it is to be understood:

(a) That the supplied signals representative of targets which move at a constant radial velocity recur at a substantially constant repetition rate and with constant, non-zero, phase differences between radar repetition periods;

(b) That the supplied signals representative of targets which move at a varying radial velocity recur at a substantially constant repetition rate and with varying phase differences between radar repetition periods; and (c) That the supplied signals representative of stationary targets recur at a substantially constant repetition rate and with approximately zero phase differences between radar repetition periods.

The signal processing apparatus also includes means 11 connected to signal source 10 through input terminal 90, for comparing the phase of the radar return signal supplied by source 10 during successive radar repetition periods. Means 11 includes means for delaying the radar return signals for one radar repetition period and means for comparing the phase of delayed signals supplied during a first repetition period with the phase of undelayed signals supplied during a second repetition period. The first mentioned means includes a coherent local oscillator 12 coupled to a signal mixer 13, a driver-amplifier 14 coupled to the output of mixer 13, and a delay line 15, coupled to the output of amplifier 14 and having a delay equal to the radar repetition period. The output of delay line 15 is coupled to post-delay amplifier 16 which, in turn, is coupled to the second mentioned means, shown in FIG. 1 as a phase detector 17 having the characteristic curve shown alongside of it. Units 13–16 comprise a delay channel through which the radar return signals are supplied to arrive at input terminal 40 of phase detector 17 one radar repetition period after they have been received.

The output of signal mixer 13 is also coupled to phase detector 17 but in a manner to bypass delay line 15, such as through conductor 18. Unit 13 and conductor 18 therefore comprise a channel through which the radar return signals are supplied to arrive at input terminal 41 of phase detector 17 without appreciable delay. Thus, each successive radar return signal is present at input terminal 41 of phase detector 17 as the radar return signal immediately preceding it in time is applied to input terminal 40. Phase detector 17 is so arranged as to produce an indication of the difference in phase between any two signals present at its input terminals.

The signal processing apparatus also includes means 19, connected to output terminal 42 of phase detector 17, for combining moving target signal indications produced during successive radar repetition periods. Means 19 includes means for delaying the moving target signal indications for one radar repetition period and means for adding the delayed indications produced during a first radar repetition period to succeeding like indications produced during succeeding radar repetition periods. The first mentioned means includes a local oscillator 20 coupled to a signal mixer 21, a driver-amplifier 22 coupled to the output of mixer 21, and a delay line 23, coupled to the output of amplifier 22 and having a delay equal to the radar repetition period. The output of delay line 23 is coupled to post-delay amplifier 24 which, in turn, is coupled through amplitude detector 25 to the second mentioned means, shown in FIG. 1 as an integrator 26. Units 21–25 comprise a delay channel through which the moving target signal indications produced at output terminal 42 of phase detector 17 are supplied to arrive at input terminal 50 of integrator 26 one repetition period after they have been produced.

The output of signal mixer 21 is also coupled through amplitude detector 27 to integrator 26 but in a manner to bypass delay line 15. Units 21 and 27 therefore comprise a channel through which the moving target signal indications produced at output terminal 42 of phase detector 17 are supplied to arrive at input terminal 51 of integrator 26 without appreciable delay. Thus, each successive moving target signal indication is present at input terminal 51 of integrator 26 as the moving target signal indication immediately preceding it in time is applied to input terminal 50. Integrator 26 is so arranged as to produce at its output terminal 52 a radar signal having a signal-to-noise ratio greater than the signal-to-noise ratio of either of the signals present at its input terminals, and correspondingly, a signal-to-noise ratio greater than the signal-to-noise ratio of the radar signals supplied by signal source 10.

The output of integrator 26 is coupled to utilizing appartus 28 which, for the example chosen, takes the form of a cathode-ray type display device.

The operation of the signal processing apparatus will be described for the case where the radar return signals received are representative of targets moving at a constant radial velocity. The apparatus operates in a similar manner for the case where the radar return signals received are representative of targets moving at a varying radial velocity. Since radar return signals representative of stationary targets are not displayed in the moving target indicator environment, it will be assumed that no stationary target return signals are being received. Thus, the input signals supplied by signal source 10 include desired signals representative of targets moving at a constant radial velocity and undesired signals representative of noise.

The moving target signal supplied by source 10 during the first radar repetition period passes through the delay channel 13–16 to arrive at input terminal 40 of phase detector 17 as the moving target signal supplied by source 10 during the second radar repetition period (and passed through the nondelay channel 13, 18) arrives at input terminal 41. Phase detector 17 develops at its output terminal 42 a nonzero voltage indication during the second radar repetition period in accordance with its characteristic curve. The "x" coordinate of the characteristic curve corresponds to the difference in phase between the two input signals while the "y" coordinate corresponds to the voltage produced at the output terminal 42 during the repetition period of interest. The portion of the characteristic curve to the right of the "y" coordinate axis corresponds to the differences in phase for targets moving away from the radar system while the portion to the left of the "y" coordinate corresponds to differences in phase for targets moving towards the radar system.

The moving target signal supplied by source 10 during the second radar repetition period also passes through the delay channel 13–16 to arrive at input terminal 40 of phase detector 17 as the moving target signal supplied by source 10 during the third radar repetition period (and passed through the nondelay channel 13, 18) arrives at input terminal 41. Since the target is moving at a constant radial velocity the difference in phase between the moving target signals present at input terminals 40 and 41 during the third radar repetition period is the same as the difference in phase between the moving target signals present at input terminals 40 and 41 during the second radar repetition period; that is, the difference in phase between the second supplied moving target signal and the first supplied moving target signal delayed for one repetition period is equal to the difference in phase between the third supplied moving target signal and the second supplied moving target signal delayed for one repetition period. The voltage indication produced during the third radar repetition period is therefore identical with that produced during the second radar repetition period. The output of phase detector 17 is a signal having a nonzero level during the radar repetition period and a level which fluctuates in a random manner about a zero level in the "x" axis between radar repetition periods. This randomly fluctuating level is due to the noise accompanying the supplied moving target signals and has an average value equal to zero along the "x" axis.

The moving target signal indication produced at the phase detector output terminal 42 during the second radar repetition period passes through the delay channel 20–25 to arrive at input terminal 50 of integrator 26 as the moving target signal indication produced at the phase detector output terminal 42 during the third radar repetition period (and passed through the nondelay channel 21, 27) arrives at input terminal 51. These two signals are added together within integrator 26, the addition being performed arithmetically. The noise signals produced between radar repetition periods are also presented to integrator 26 where they too are added together. However, these signals are added together not in an arithmetic manner but in a root-mean-square manner due to their random fluctuations. Thus, the signal produced at output terminal 52 of integrator 26 is one having a greater signal-to-noise ratio than either of the moving target signal indications present at the input terminals of integrator 26.

The signal produced by integrator 26 is applied to utilizing apparatus 28 which, when in the form of a cathode-ray type display device, displays both the moving target and noise signals on the face of the cathode-ray tube. The improvement in the signal-to-noise ratio of the signal produced by integrator 26 however, is such as to increase the brightness of the displayed moving target with respect to the displayed noise. As a result, there is a corresponding increase in the ease with which a moving target may be located on the face of the cathode-ray tube in the presence of noise.

There is shown in FIG. 2 a modified form of signal processing apparatus similar to the apparatus of FIG. 1, in which corresponding components carry the same reference numerals as in FIG. 1, except preceded by the numeral "2." The apparatus of FIG. 2 differs from the apparatus of FIG. 1, in that in the apparatus of FIG. 2 one delay line (60) is employed to provide the requisite delays for both the phase comparing means 11 and for the indication combining means 19, rather than two delay lines (15 and 23) as was employed in the apparatus of FIG. 1. In the arrangement shown in FIG. 2, the signal produced at the output of mixer 213 is of a first frequency $f_1$, the signal produced at the output of mixer 221 is of a second frequency $f_2$, and the bandwidth of delay line 60 is sufficiently broad to pass both these signals simultaneously. Filter network 70, a and b, and filter network 80, a and b, tuned to frequencies $f_1$ and $f_2$, respectively, are included to prevent crosstalk between the two mixer signals within delay line 60. The operation of the apparatus of FIG. 2 is identical to the operation of the apparatus of FIG. 1.

The signal processing apparatus shown in FIG. 1 or FIG. 2 may be modified slightly by replacing integrator 26, in the first case, or integrator 226, in the second case, with a correlator. With such a modification the delayed and nondelayed moving target signal indications produced by phase detector 17 will be multiplied together instead of being added together. The same will be true of the noise indications. However, the signal developed at the correlator output terminal will, like the signal developed at the integrator output terminal, have a signal-to-noise ratio greater than the signal-to-noise ratio of the signals present at its input terminals.

It will be evident from the foregoing description that it is possible to extend the two pulse comparison arrangement described to an arrangement wherein many successive pulses are compared. With such an arrangement, the signal-to-noise ratio of the signal coupled to the cathode-ray display device will continue to increase as more and more moving target signals are supplied by source 10. Such a setup may be produced by replacing unit 19 in FIG. 1 (or unit 219 in FIG. 2) with either of the video integrator arrangements described in pending application Serial No. 106,332, filed April 28, 1961, now Patent number 3,201,705, and entitled, "Integrator for Periodically Recurring Signals."

While the invention has been described in the environment of a system in which the signals supplied differ in phase from one repetition period to the next, it will be obvious that the teachings of the present invention are equally applicable in systems in which the signals supplied differ in frequency or amplitude from repetition period to repetition period. Although certain components of the individual systems will be different (for example, the phase detector of either FIG. 1 or FIG. 2 may be replaced by a signal mixer-frequency discriminator combination, to convert the phase characteristic environment described into a frequency characteristic environment, or by a differential amplifier to convert the phase characteristic environment into an amplitude characteristic environment), the invention will continue to operate to produce indications when signals received during successive repetition periods have dissimilar characteristics (e.g., frequency or amplitude) and output signals when indications produced during successive repetition periods have similar characteristics.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. Signal processing apparatus for improving the signal-to-noise ratio of moving target radar signals comprising:

a source of input signals, said input signals including moving target signals which recur at a substantially constant repetition rate with phase variations between repetition periods and stationary target signals which recur at a substantially constant repetition rate with no phase variations between repetition periods;

means for comparing the phase of input signals received during successive radar repetition periods, said means including a first delay line for delaying received signals for one radar repetition period and a phase detector for comparing the phase of delayed signals received during a first radar repetition period with the phase of undelayed signals received during a second radar repetition period, said phase detector being arranged to produce substantially no output signal indications for stationary target signals and to produce output signal indications representative of the phase difference between moving target signals received during successive radar repetition periods;

and means for combining moving target signal indications produced during a first radar repetition period with moving target signal indications produced during a second radar repetition period, said means including a second delay line for delaying said signal indications for one radar repetition period and an integrator for adding said delayed signal indications produced during said first radar repetition period to said delayed signal indications produced during said second radar repetition period so as to produce output signals having an improved signal-to-noise ratio representative of moving targets.

2. Signal processing apparatus for improving the signal-to-noise ratio of moving target radar signals according to claim 1 in which the means for delaying received signals for one radar repetition period and the means for delaying phase difference indication for one radar repetition period are one and the same means.

3. Signal processing apparatus for improving the signal-to-noise ratio of moving target radar signals according to claim 2 in which said one and the same means consists of a delay line and a filter network connected in series therewith, said filter network having two portions, one of which is turned to the frequency of the received signals and the other of which is tuned to the frequency of the phase difference indications.

References Cited by the Examiner
UNITED STATES PATENTS

| | | | |
|---|---|---|---|
| 2,659,079 | 11/1953 | Cunningham | 343—7.7 |
| 2,842,761 | 7/1958 | Downs | 343—7.7 |
| 2,896,162 | 7/1959 | Berger. | |

CHESTER L. JUSTUS, *Primary Examiner.*

LEWIS H. MYERS, *Examiner.*

R. D. BENNETT, *Assistant Examiner.*